(12) United States Patent
Kamiya et al.

(10) Patent No.: US 7,774,591 B2
(45) Date of Patent: Aug. 10, 2010

(54) DATA PROCESSING DEVICE AND DATA PROCESSING METHOD

(75) Inventors: Satoshi Kamiya, Tokyo (JP); Hiroshi Ueno, Tokyo (JP); Akihiro Motoki, Tokyo (JP); Takeo Hayashi, Tokyo (JP)

(73) Assignee: Nec Corporation, Tokyo (JP)

( * ) Notice: Subject to any disclaimer, the term of this patent is extended or adjusted under 35 U.S.C. 154(b) by 655 days.

(21) Appl. No.: 11/620,419

(22) Filed: Jan. 5, 2007

(65) Prior Publication Data

US 2007/0174605 A1  Jul. 26, 2007

(30) Foreign Application Priority Data

Jan. 5, 2006  (JP) ............................. 2006-000468

(51) Int. Cl.
G06F 1/24  (2006.01)
(52) U.S. Cl. .......................................... 713/100; 713/1
(58) Field of Classification Search ...................... 713/1, 713/100
See application file for complete search history.

(56) References Cited

U.S. PATENT DOCUMENTS

| 5,206,951 A * | 4/1993 | Khoyi et al. ................. 719/315 |
| 6,055,650 A | 4/2000 | Christie |
| 6,209,077 B1 * | 3/2001 | Robertson et al. ............. 712/17 |
| 2003/0028673 A1 * | 2/2003 | Lin et al. ..................... 709/247 |
| 2004/0216122 A1 * | 10/2004 | Gram et al. .................. 719/310 |
| 2005/0144515 A1 * | 6/2005 | Yano et al. ....................... 714/7 |

FOREIGN PATENT DOCUMENTS

| JP | 4-42342 A | 2/1992 |
| JP | 11-85608 A | 3/1999 |
| JP | 2001-67212 A | 3/2001 |
| JP | 2002-530780 A | 9/2002 |
| JP | 2003-208305 A | 7/2003 |

(Continued)

OTHER PUBLICATIONS

Mollick, Establishing Moore's Law, Jul.-Sep. 2006, IEEE Annals of the History of Computing, IEEE Computing Society, pp. 62, 70.*

(Continued)

*Primary Examiner*—Chun Cao
(74) *Attorney, Agent, or Firm*—Sughrue Mion, PLLC (57) ABSTRACT

A data processing device includes a memory, a processing unit, a logic element, a first database and a management unit. The memory stores a plurality of software modules which processes input data. The processing unit enables to execute the plurality of software module. The logic element enables to configure a plurality of hardware modules, which can perform processings equivalent to those performed by the plurality of software module, using a dynamic reconfiguration. The first database stores configuration information indicating a configuration of the plurality of hardware modules when the plurality of hardware modules is set to the logic element. The management unit determines a first software module to be set to the logic element as a hardware module in the plurality of software modules on the basis of a predetermined condition with respect to a processing of the input data, and sets a first hardware module corresponding to the first software module to the logic element with reference to the first database.

16 Claims, 7 Drawing Sheets

FOREIGN PATENT DOCUMENTS

| | | |
|---|---|---|
| JP | 2004/5110 A | 1/2004 |
| JP | 2004-343559 A | 12/2004 |
| JP | 2004-362446 A | 12/2004 |
| WO | WO 01/90887 A1 | 11/2001 |

OTHER PUBLICATIONS

John L. Hennessy et al., "Computer Organization and Design", The Hardware/Software Interface, 1998, pp. 450, 461, 469, 489-491, 491, MIPs appendix, Second Edition, Morgan Kaufmann Publishers, Inc., San Francisco, US.

U.S Appl. No. 11/701,385 filed by Takeo Hayashi on Feb. 2, 2007.

"Product Lineup_64-Bit VR Series", NEC Electronics Corporation, Internet URL: http://www.necel.com/micro/product/vr/vr4133/index.html.

"AES Cipher Engine", Techno Create, Internet URL: http://www.techno-create.com/hot/aes.html.

* cited by examiner

| DATA TYPE | DATA PROCESSING | DATA PROCESSING MODULE 52 | |
|---|---|---|---|
| | | HARDWARE | SOFTWARE |
| TYPE 1 | PROCESSING A | HARDWARE MODULE 1 | SOFTWARE MODULE 1 |
| TYPE 2 | PROCESSING B | HARDWARE MODULE 2 | SOFTWARE MODULE 2 |
| TYPE 3 | PROCESSING C | HARDWARE MODULE 3 | SOFTWARE MODULE 3 |
| TYPE 4 | PROCESSING D | HARDWARE MODULE 4 | SOFTWARE MODULE 4 |
| TYPE 5 | PROCESSING E | (null) | SOFTWARE MODULE 5 |
| TYPE OUTPUT | PROCESSING OUTPUT | IF UNIT | (null) |
| others | PROCESSING Z | (null) | SOFTWARE MODULE Z |

| DATA TYPE | DATA PROCESSING | DATA PROCESSING MODULE |
|---|---|---|
| TYPE 1 | PROCESSING A | HARDWARE MODULE 1 |
| TYPE 2 | PROCESSING B | HARDWARE MODULE 2 |
| TYPE 3 | PROCESSING C | HARDWARE MODULE 3 |
| TYPE 4 | PROCESSING D | SOFTWARE MODULE 4 |
| TYPE OUTPUT | PROCESSING OUTPUT | IF UNIT |
| others | PROCESSING Z | SOFTWARE MODULE Z |

| DATA TYPE | DATA PROCESSING | DATA PROCESSING MODULE |
|---|---|---|
| TYPE 1 | PROCESSING A | HARDWARE MODULE 1 |
| TYPE 2 | PROCESSING B | SOFTWARE MODULE 2 |
| TYPE 3 | PROCESSING C | HARDWARE MODULE 3 |
| TYPE 4 | PROCESSING D | HARDWARE MODULE 4 |
| TYPE OUTPUT | PROCESSING OUTPUT | IF UNIT |
| others | PROCESSING Z | SOFTWARE MODULE Z |

| DATA PROCESSING MODULE | CIRCUIT-ALLOCATED STATE | LRU TIME | NUMBER OF HARDWARE REQUESTS | HARDWARE START THRESHOLD VALUE |
|---|---|---|---|---|
| HARDWARE MODULE 1 | ALLOCATION | 100 | — | 3 |
| HARDWARE MODULE 2 | ALLOCATION | 20000 | — | |
| HARDWARE MODULE 3 | ALLOCATION | 1000 | — | |
| HARDWARE MODULE 4 | UNALLOCATION | — | 2 | |

| DATA PROCESSING MODULE | CIRCUIT ARRANGEMENT REGION |
|---|---|
| HARDWARE MODULE 1 | REGIONS $\alpha$ TO $\beta$ |
| HARDWARE MODULE 2 | REGIONS $\beta$ TO $\gamma$ |
| HARDWARE MODULE 3 | REGIONS $\delta$ TO $\varepsilon$ |
| UNUSED REGION | REGIONS $\gamma$ TO $\delta$, AND $\varepsilon$ OR LATER |

DATA PROCESSING DEVICE AND DATA PROCESSING METHOD

BACKGROUND OF THE INVENTION

1. Field of the Invention

The present invention relates to a data processing device and a data processing method, in particular, a data processing device and a data processing method in which a logic circuit is dynamically reconfigurable.

2. Description of the Related Art

In recent years, regarding a circuit for performing various data processings, a "dynamic reconfigurable logic device (dynamic reconfigurable hardware)" capable of dynamically changing a configuration of the circuit and dynamically changing a connection to a computing unit has been realized. Examples of the reconfigurable logic device include FPGA (Field Programmable Gate Array), CPLD (Complex Programmable Logic Device), PCA (Plastic Cell Architecture) and Reconfigurable Processor (RP). Such a reconfigurable logic device is regarded as a promising device capable of introducing flexibility of software into hardware having a characteristic of high-speed processing. Thus, apparatuses using this device have been proposed.

Japanese Laid-Open Patent Application JP-P2004-343559A discloses an example of a data processing device having a conventional reconfigurable integrated circuit unit. The data processing device has an integrated circuit unit capable of executing a plurality of data processings by changing at least a part of the circuit configuration. The data processing device further has a database which stores a plurality of configuration data available in the integrated circuit unit and a control unit which can select processing to be executed in the data processing device. The control unit has a reconfiguration function and a trial function. On the basis of the configuration data of the database, the reconfiguration function configures the integrated circuit unit so as to correspond to processing active in the data processing device. The trial function temporarily changes at least a part of the configuration of the integrated circuit unit on the basis of the configuration data of the database so that evaluation may be made when another processing which can be replaced with the active processing is performed in the data processing device, performs at least a part of the another processing on a trial basis and makes the highly-evaluated another processing the active processing in the data processing device. In this conventional example, a software wireless terminal using a reconfigurable processor (RP) is used. This example discloses a method of changing circuit configuration according to change in environment (communication quality in this example) by using a reconfigurable processor.

Japanese Laid-Open Patent Application JP-P2002-530780A (WO00/31652) discloses an example of a conventional reconfigurable programmable logic device computer system. The reconfigurable computer system has a central processing unit and a programmable logic. The central processing unit is run on at least one programmable logic device. The programmable logic is combined with the central processing unit and can be reconfigured so that performances of the computer system may be optimized to process a given application. This conventional example is an example of a reconfigurable computer using a programmable logic device (PLD). In this example, functions of an application run in the computer are allocated to a hardware processing part and a software processing part under constraint of hardware resource at the time of system design, and hardware resource allocation and software processing allocation are respectively performed at activation of the system.

International Publication WO01/090887 discloses a program processing method of performing a high-speed processing by using a conventional dynamic reconfigurable hardware and a program of executing the processing method. This program processing method is a processing method of a source program run on a computer. The program processing method has an evaluating step of analyzing a source program to obtain a use cost value of the computer resources in the unit of predetermined program modules forming the source program and selecting a program module with a high use cost value; an editing step of generating a hardware module object which constructs configuration of a dynamic reconfigurable hardware so as to perform processing of the selected program module, and adding a pseudo function of calling the selected program module to change the source program; an executing step of executing the changed source program by the hardware constructed according to the hardware module object and the computer. In this conventional example, the hardware module object using hardware which can dynamically reconfigure the program module with a high use cost value of computer resources is called at the time of edition of the software run on a CPU (Central Processing Unit).

In recent years, in the data processing devices, with an increase in an input/output line speed, an input/output traffic volume of the devices has increased. For this reason, to improve data processing performance, the number of parts where input/output data is processed by using hardware has increased. On the other hand, devices such as firewalls, intrusion detection/prevention devices, computer virus detectors and application layer relay devices, which deal with a higher-order network layer in terms of contents of data processing, are now in increasing demand. In such data processing devices, flexibility is required to address various protocols and applications. Thus, such tasks are mainly processed by software. However, a processing performance of software greatly depends on processing performance of a processor. Thus, to greatly improve a processing performance, it is necessary to execute "hardware offload" by separating off the processing to be hardware while sacrificing flexibility of the software.

In terms of offload, there are a software module, which performs processing on the CPU, and a hardware module, which performs processing in a hardware circuit in a processing block in the device. Generally, different processings are allocated to the software module and the hardware module, respectively. On the other hand, the same processing may be allocated to the software module and the hardware module. In this case, an application programming interface (API) of the software module and the hardware module can be defined so that the same result may be output when the same input data and parameter are given.

Since the hardware module is composed of a fixed hardware circuit, the hardware module has no flexibility in arrangement, such as whether to dispose the function on the device or in change of function. However, when a reconfigurable logic device is used in the device, it is possible to introduce the flexibility of software, in addition to a high-speed processing, into the hardware module. Unless specifically defined, hereinafter, the hardware module will be regarded as the hardware module expanded on the reconfigurable logic device.

In terms of the processing performance such as data processing volume per unit time and time necessary for data processing, the hardware module is more advantageous than the software module. On the other hand, resources necessary for a software processing are the CPU and a processing memory, and a resource necessary for the hardware processing is a logic element (reconfigurable or fixed). Consequently, in terms of resource costs, the hardware module is more expensive than the software module. The hardware module using a reconfigurable logic element is more expensive than the hardware module using a fixed logic element as a whole. Therefore, by setting the module with high frequency of use or the module with extremely excellent processing performance as the hardware module and the module with low frequency of use or the module having less difference in performance between the hardware and the software as the software module, cost performance of the whole device can be improved.

However, selection of the hardware module or the software module may vary depending on time zone, location of the device and so on. Variation due to time zone means the case where tendency of the data types varies with time. In this case, an environmental adaptation system using dynamic reconfiguration is especially effective in exhibiting performances. Conventionally, to address change in time and difference of location of the device, the function module has no option but to be the software module. However, by using the reconfigurable logic device, it becomes possible to address change in time and difference of location of the device also in the hardware module. Since the function can be changed in the same hardware at this time, the change of function can be achieved in the state where the processing performance is kept high.

When the reconfigurable logic device is used in the data processing device in this manner, the processing performance can be improved and the problem of flexibility of processing can be solved. However, in the data processing device using the existent reconfigurable logic device, there is no method of achieving various processings in the software module and the hardware module simultaneously, and switching processing between the software module and the hardware module.

For example, in the conventional technique disclosed in Japanese Laid Open Patent Application JP-P2004-343559A, it is presumed that processing circuit is used in which the processing scale is as small as that can be treated by the reconfigurable processor. That is, it is not assumed that processing is performed by software and the technique of dynamically switching between the software module and the hardware module is not disclosed. In the conventional technique disclosed in Japan Laid Open patent Application JP-P2002-530780A (WO00/31652), reconfiguration is carried out only at activation of the system and the technique of changing processing allocation between the hardware and the software during operation of the system is not disclosed. In the conventional technique disclosed in International Publication WO01/090887, the module processed by hardware is fixed at edition of the software and the technique of changing processing allocation between the hardware and the software during operation of the system is not disclosed.

As a related technique, Japanese Laid Open Patent Application JP-P2004-5110A discloses information equipment and a launcher program. The information equipment has a launcher function and includes an application activation judging means, a registered application search means and an application registering means. The application activation judging means judges that an application is activated from a function other than the launcher function. The registered application search means determines whether or not the application judged as being activated by the application activation judging means is registered in the launcher function. When determination is made that the application is not registered in the launcher function by the registered application search means, the application registering means registers the application in the launcher function.

Japanese Laid Open Patent Application JP-P2004-362446A discloses a calculator and a calculating method. The calculator has a hardware module, a storage unit and an execution unit. The hardware module performs a predetermined processing. The storage unit stores a software module which performs the same processing as the predetermined processing performed by the hardware module therein. The execution unit selects execution by the hardware module or execution by the software module stored in the storage unit. The hardware module is made to perform the processing when the execution by the hardware module is selected, and the software module is made to perform the processing when the execution by the software module is selected.

SUMMARY OF THE INVENTION

Therefore, an object of the present invention is to provide a data processing device and a data processing method which can dynamically reconfigure a logic circuit on the basis of processing details and throughput of data to be input.

Another object of the present invention is to provide a data processing device and a data processing method which can dynamically switch between the software processing and the hardware processing by using a function of setting/canceling the hardware processing to a dynamic reconfigurable logic element.

This and other objects, features and advantages of the present invention will be readily ascertained by referring to the following description and drawings.

In order to achieve an aspect of the present invention, the present invention provides a data processing device including: a memory which stores a plurality of software modules which processes input data; a processing unit which executes the plurality of software module; a logic element configured to implement a plurality of hardware modules, which can perform processings equivalent to processing performed by the plurality of software modules, using a dynamic reconfiguration; a first database which stores configuration information indicating a configuration of the plurality of hardware modules when the plurality of hardware modules is set to the logic element; and a management unit which determines a first software module to be set to the logic element as a hardware module in the plurality of software modules on the basis of a predetermined condition with respect to a processing of the input data, and sets a first hardware module corresponding to the first software module to the logic element with reference to the first database.

In the data processing device, the management unit may determine the first software module on the basis of a first frequency of use of each of the plurality of software modules, determine a second hardware module to be released from the logic element in the plurality of hardware modules on the basis of a second frequency of use of each of the plurality of hardware modules which is set to the logic element, release the second hardware module from the logic element, and set the first hardware module to the logic element.

In the data processing device, the management unit may determine the first software module of which the first frequency of use is relatively high in the plurality of software modules, and determine the second hardware module of which the second frequency of use is relatively low in the plurality of hardware modules.

In the data processing device, the second frequency of use may be determined on the basis of the number of use and operating time of each of the plurality of hardware modules.

In the data processing device, the second frequency of use may be determined on the basis of LRU (Least Recently Used) time as the time which has elapsed since last data processing.

In the data processing device, the second frequency of use is determined on the basis of a FIFO rule.

The data processing device may further include: a second database which associates a data type with one of a software module and a hardware module set to the logic element; and a data input unit which receives the input unit. On the basis of a data type of the input data, with reference to the second database, when the data type of the input data corresponds to one of the plurality of hardware module set to the logic element, the data input unit may transfer the input data to the corresponding one hardware module. When the data type of the input data does not correspond to any of the plurality of hardware module set to the logic element, the data input unit may transfer the input data to the processing unit.

In order to achieve another aspect of the present invention, the present invention provides a data processing device including: a management unit which determines a setting state of a hardware module when the hardware module is set to or released from a dynamically reconfigurable logic element; a database which associates a data type with one of a software module and a hardware module set to the logic element, and is updated on the basis of the setting state; and a data input unit which receives input data. On the basis of a data type of the input data, with reference to the database, when the data type of the input data corresponds to the hardware module set to the logic element, the data input unit may transfer the input data to the corresponding hardware module.

In the data processing device, on the basis of the data type of the input data, with reference to the database, when the data type of the input data does not correspond to the hardware module set to the logic element, the data input unit may transfer the input data to a processing unit.

In the data processing device, the management unit may determine the releasing of the hardware module set to the logic element on the basis of a frequency of use of the hardware module, and set a hardware module corresponding to the software module to the logic element on the basis of a frequency of use of the software module.

In order to achieve another aspect of the present invention, the present invention provides a data processing method including: (a) determining a first software module to be set to a dynamically reconfigurable logic element as a hardware module in a plurality of software modules stored in a memory, on the basis of a predetermined condition with respect to a processing of input data; and (b) setting a first hardware module corresponding to the first software module to the logic element with reference to a first database which stores configuration information indicating a configuration of a hardware module when the hardware modules is set to the logic element.

In the data processing method, the step (a) may include: (a1) determining the first software module on the basis of a first frequency of use of each of the plurality of software modules, and (a2) determining a second hardware module to be released from the logic element in an existing plurality of hardware modules which is set to the logic element, on the basis of a second frequency of use of each of the existing plurality of hardware modules. The step (b) may include: (b1) releasing the second hardware module from the logic element, and (b2) setting the first hardware module to the logic element.

In the data processing method, the step (a1) may include: (a11) determining the first software module of which the first frequency of use is relatively high in the plurality of software modules. The step (a2) may include: (a21) determining the second hardware module of which the second frequency of use is relatively low in the existing plurality of hardware modules.

In the data processing method, the second frequency of use may be determined on the basis of the number of use and operating time of each of the existing plurality of hardware modules.

In the data processing, the second frequency of use may be determined on the basis of LRU (Least Recently Used) time as the time which has elapsed since last data processing.

In the data processing, the second frequency of use may be determined on the basis of a FIFO rule.

The data processing method may further include: (c) with reference to a second database which associates a data type with one of a software module and a hardware module set to the logic element, on the basis of a data type of the input data, transferring the input data to the hardware, module when the data type of the input data corresponds to the hardware module set to the logic element.

In order to achieve another aspect of the present invention, the present invention provides a data processing method including: (a) determining a setting state of a hardware module when the hardware module is set to or released from a dynamically reconfigurable logic element; and (b) with reference to a database which associates a data type with one of a software module and a hardware module set to the logic element, and is updated on the basis of the setting state, on the basis of a data type of input data, transferring the input data to the hardware module, when the data type of the input data corresponds to the hardware module set to the logic element.

The data processing method, the step (b) may include: (b1) on the basis of the data type of the input data, with reference to the database, transferring the input data to a processing unit when the data type of the input data does not correspond to the hardware module set to the logic element.

In the data processing method, the step (a) may include: (a1) determining the releasing of the hardware module set to the logic element on the basis of a frequency of use of the hardware module, and (a2) setting a hardware module corresponding to the software module to the logic element on the basis of a frequency of use of the software module.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Figure 1:
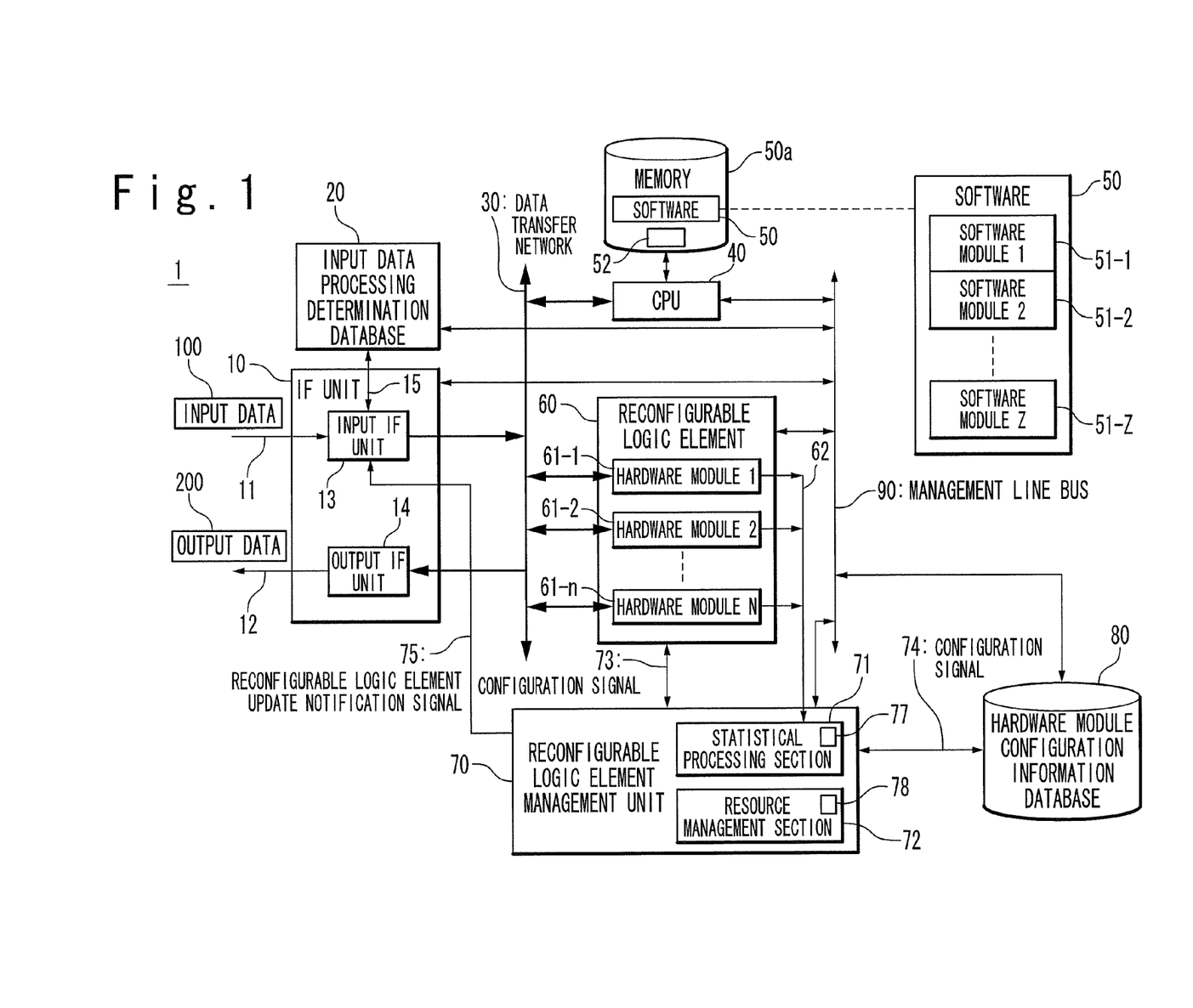
FIG. 1 is a block diagram showing configuration of an embodiment of a data processing device according to the present invention.

Embodiments of a data processing device and a data processing method according to the present invention will be described below with reference to the attached drawings. FIG. 1 is a block diagram showing an embodiment of a data processing device of the present invention. The data processing device 1 has an interface (IF) unit 10, an input data processing determination database 20, a data transfer network 30, a central processing unit (CPU) 40, a memory 50a, a reconfigurable logic element 60, a reconfigurable logic element management unit 70, a hardware module configuration information database 80 and a management line bus 90.

The IF unit 10 exchanges data between an external device of the data processing device 1 and the data processing device 1. The IF unit 10 has an input IF unit 13 and an output IF unit 14. For temporary storage of input data 100 and output data 200, the IF unit 10 may have a buffer (not shown) therein.

The input IF unit 13 receives the input data 100 from the outside of the data processing device 1 through an input port 11. The input IF unit 13 transmits data to the data transfer network 30. The input IF unit 13 is connected to the input data processing determination database 20 and communicates with each other by a database access signal 15. The input IF unit 13 is connected to the reconfigurable logic element management unit 70 and receives a reconfigurable logic element update notification signal 75 from the reconfigurable logic element management unit 70. The output IF unit 14 receives data from the data transfer network 30. The output IF unit 14 transmits the output data 200 to the outside of the data processing device 1 through an output port 12.

The input data processing determination database 20 acquires all or part of the input data 100 from the input IF unit 13. The all or part of the input data 100 is contained in the database access signal 15 sent from the input IF unit 13. To determine processing of the input data 100 in the data processing device 1, the type of the data 100 is determined to decide processing details and a processing block. Data for determination is stored in the input data processing determination database 20.

Figure 5A:
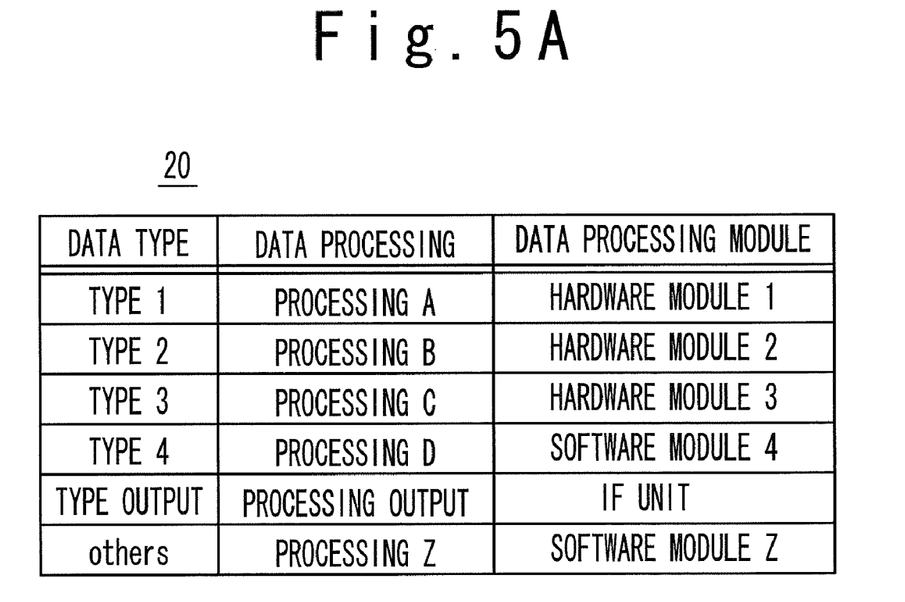
FIG. 5A is a table showing a configuration of an input data processing determination database 20.
Figure 5B:
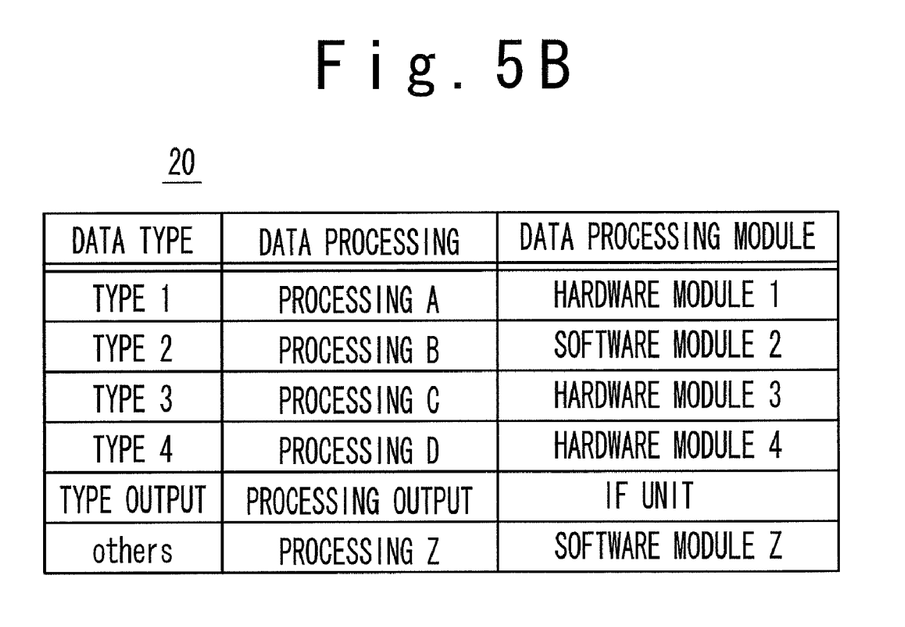
FIG. 5B is a table showing a configuration of updated input data processing determination database 20.

FIGS. 5A and 5B are tables showing examples of configuration of the input data processing determination database 20. Data types, data processings and data processing modules are associated with one another. As described later, FIG. 5A shows contents of the input data processing determination database 20 at a certain time. FIG. 5B shows contents of the input data processing determination database 20 after configuration of hardware modules in the reconfigurable logic element 60 is updated.

In FIG. 5A, the data types are classified into a Type 1 to a Type 5, a Type Output and others. Processings A to D, Processing Output (output processing) and processing Z correspond to the data types, respectively, as data processings to be performed to the data with the data types. A hardware module 1 to a hardware module 3, a software module 4, the IF unit and a software module Z correspond to the data processings, respectively, as the data processing modules which perform the data processings. These hardware modules denote hardware modules 61 realized on the below-mentioned reconfigurable logic element 60. These software modules denote software modules 51 stored in the below-mentioned memory 50a.

In FIG. 5B, in comparison with FIG. 5A, the data processing module for the processing D is changed from the software module 4 to the hardware module 4, and the data processing module for the processing B is changed from the hardware module 2 to the software module 2. The hardware module 4 is the hardware module 61 newly realized on the reconfigurable logic element 60. The software module 2 is the software module 51 stored in the memory 50a.

Referring to FIG. 5A, for example, when the data type of the input data 100 is the Type 1, the processing A is selected as a data processing method. In the processing A, at this time, the hardware module 1 is selected as the data processing module. Accordingly, the input data processing determination database 20 instructs the input IF unit 13 to transfer the input data 100 to the hardware module 1 such that the hardware module 1 of the reconfigurable logic element 60 performs the processing A. When the data type of the input data 100 is the Type 4, the processing D is selected as the data processing method and the software module 4 of the software module is selected as the data processing module. In this case, the input data processing determination database 20 instructs the input IF unit 13 to transfer the data 100 to the CPU 40 such that the CPU 40 performs the software module 4 to execute the processing D.

On the basis of search result sent from the input data processing determination database 20, the input IF unit 13 transfers the input data 100 to the processing block where the data is processed. The processing block is one of the CPU 40, the reconfigurable logic element 60 and the output IF unit 14.

When the configuration of the hardware module in the reconfigurable logic element 60 is changed, the reconfigurable logic element management unit 70 transmits the reconfigurable logic element update notification signal 75 containing the changes to the input IF unit 13. The input IF unit 13 transmits the changes to the input data processing determination database 20. On the basis of the changes, the input data processing determination database 20 updates contents of the database.

The input IF unit 13, the output IF unit 14, the CPU 40, the below-mentioned hardware module 1_61-1 to hardware module N_61-N in the reconfigurable logic element 60 are communicatably connected to one another via the data transfer network 30. Any connection mode such as bus, ring, star and mesh can be adopted as long as communication among the components can be achieved.

The CPU 40 reads a software 50 in the memory 50a as a processing program and manages whole of the data processing device 1 via the management line bus 90 while performing the data processing supplied from the data transfer network 30. Here, the CPU 40 may be formed of two or more CPUs in terms of throughput and function allocation. For example, functions may be allocated to the CPU which performs mainly processing of the input data sent from the data transfer network 30 and the CPU which manages whole of the data processing device via the management line bus 90.

In the software 50, processing details for all types of the input data are defined. The CPU 40 can address the processing details. In this specification, a processing block for each type of the input data 100 is referred to as a module. That is, software module 1_51-1 to software module Z_51-Z for all types of the input data 100 are stored in the software 50.

The software 50 has a function of managing information on the types of the hardware modules available in the data processing device 1. That is, the below-mentioned types of the hardware modules 61 are equal to types of the software modules 51 or become a subset of processings which can be executed in the software modules 51. The software 50 manages correspondence between the processing details for the types of the input data 100 and processing modules (software modules/hardware modules).

Figure 4:
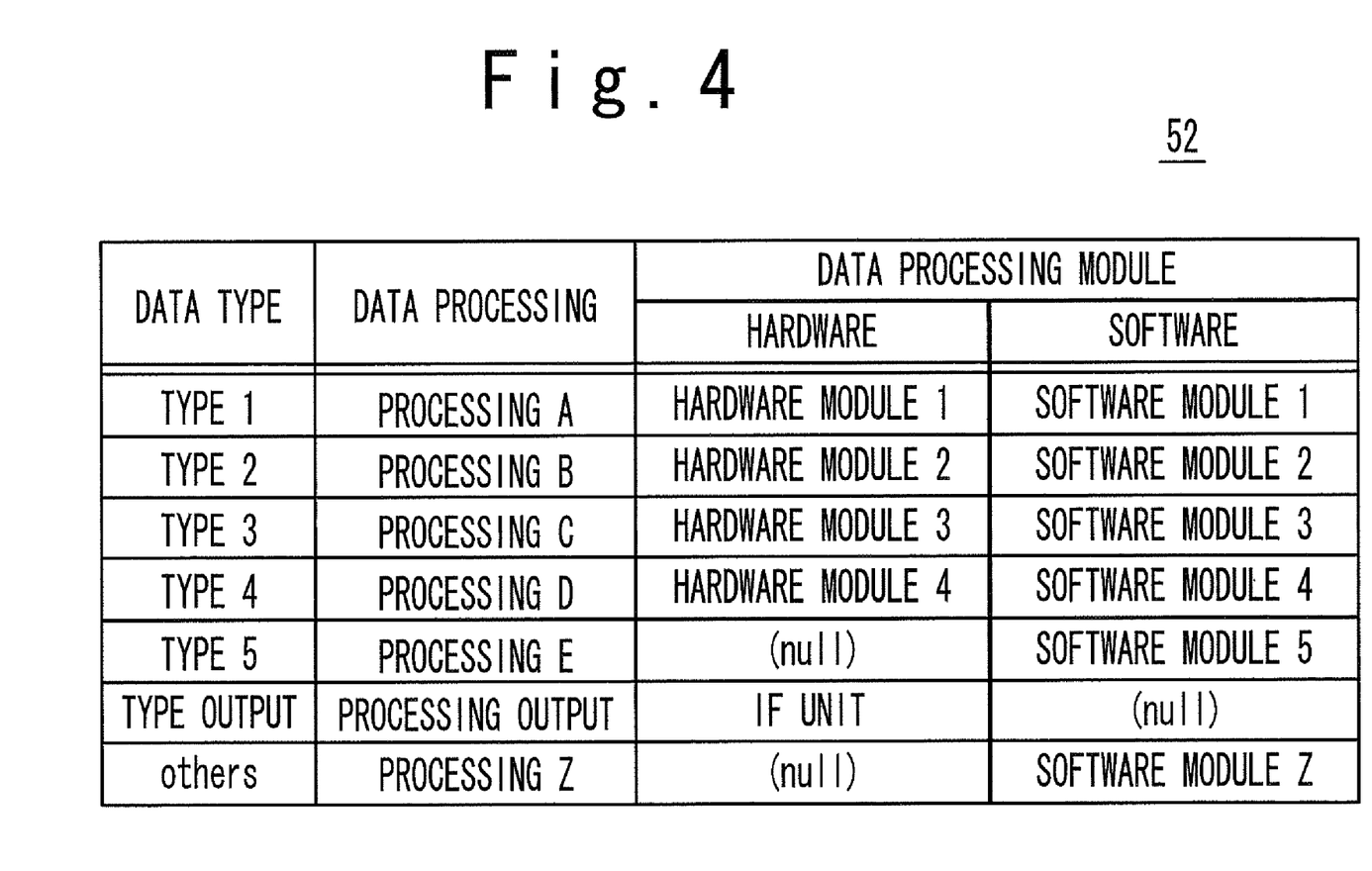
FIG. 4 shows a correspondence table 52 to data types and data processing modules.

FIG. 4 shows an example of a correspondence table 52 to the data types and the data processing modules. The memory 50a stores the correspondence table 52 therein. The data types, the data processings and the data processing modules are associated with one another. The data types are classified into the Type 1 to the Type 5, the Type Output and others. The processings A to E, the Processing Output (output processing) and the processing Z correspond to the data types, respectively, as the data processing to be performed to the data with the data types. The hardware/software modules correspond to the data processings, respectively, as the data processing modules which perform the data processings. That is, the same data processing is allocated to each of the software module and the hardware module. In this case, the software module and the hardware module are set such that the same result is outputted when the same input data is given. When there is no corresponding module, "null" is shown. These hardware modules denote the hardware modules 61 which can be realized (a part of which are realized) on the reconfigurable logic element 60 and the definition thereof is stored in the below-mentioned hardware module configuration information database 80. These software modules denote the software modules 51 stored in the memory 50a.

The reconfigurable logic element 60 is composed of dynamic reconfigurable logic devices (hardware). The reconfigurable logic devices include FPGA (Field Programmable Gate Array), CPLD (Complex Programmable Logic Device), PCA (Plastic Cell) and RP (Reconfigurable Processor).

The hardware module 1_61-1 to the hardware module N_61-N are provided in the reconfigurable logic element 60. The hardware module 1_61-1 to the hardware module N_61-N are connected to the data transfer network 30, enabling data communication with the input IF unit 13, the CPU 40 and the output IF unit 14.

Each of the hardware modules 1_61-1 to the hardware module N_61-N notifies circuit use notification information 62 to the reconfigurable logic element management unit 70. The circuit use notification information 62 is information on frequency of data processing in unit of input data by the hardware module 1_61-1 to the hardware module N_61-N. Specific examples of the information on frequency include the number of activation and an operation duration time of each of the hardware module 1_61-1 to the hardware module N_61-N.

The reconfigurable logic element management unit 70 has a statistical processing section 71 and a resource management section 72. The statistical processing section 71 totals the circuit use notification information 62 notified from the hardware module 1_61-1 to the hardware module N61-N respectively and manages statistical information on usage frequency of the hardware module 1_61-1 to the hardware module N_61-N (the number of uses and operating time of each hardware module). A processing item performed by software is notified from the CPU 40 via the management line bus 90.

On the basis of the notified processing item, the hardware module 61 newly disposed in the reconfigurable logic element 60 is selected.

Figure 6:
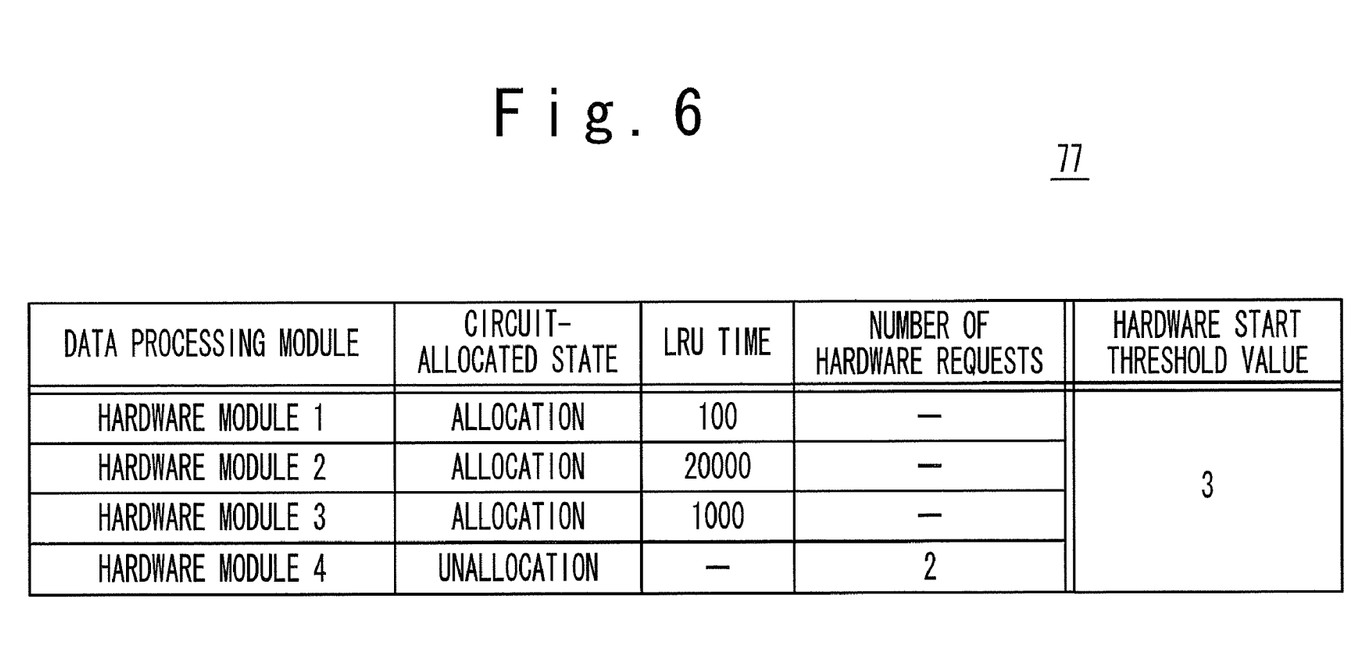
FIG. 6 is a view showing a management information table 77 in the statistical processing section 71.

FIG. 6 is a table showing an example of a management information table 77 in the statistical processing section 71. The data processing modules, a circuit allocation state, LRU time and the number of hardware requests are associated with one another. Furthermore, the number of use and operating time of each hardware module may be associated. The data processing modules (corresponding to the hardware module 1_61-1 to the hardware module N_61-N) has hardware modules (1 to 3) configured (circuit-allocated) in the reconfigurable logic element 60 and a circuit-unallocated hardware module (4). Allocation or unallocated at the present time, is represented to each hardware module as a circuit allocation state. For each allocated hardware modules (1 to 3), the time which has elapsed since last data processing is shown as LRU (Least Recently Used). For the unallocated hardware module (4), the number of hardware requests from the software module is totaled as the number of hardware requests.

The LRU time field represents that frequency of use is higher as the LRU time as the time which has elapsed since last data processing is shorter. In other words, according to a LRU rule, the hardware module with long LRU time is preferentially released. However, the LRU time field is merely an example. Information other than the LRU rule, as long as it represents the use state of the hardware modules, may be placed. Alternatively, on the basis of order information according to a FIFO (First In First Out) rule as another example, the hardware module may be released.

A hardware start threshold value is used to make the hardware request from the statistical processing section 71 effective when the number of hardware requests of the unallocated data processing module exceeds the threshold value. Provision of the threshold value can cull one-time hardware request and prevent frequent allocation and release processing. When the hardware start threshold value is set as 1, one hardware request results in switch to hardware.

Figure 7:
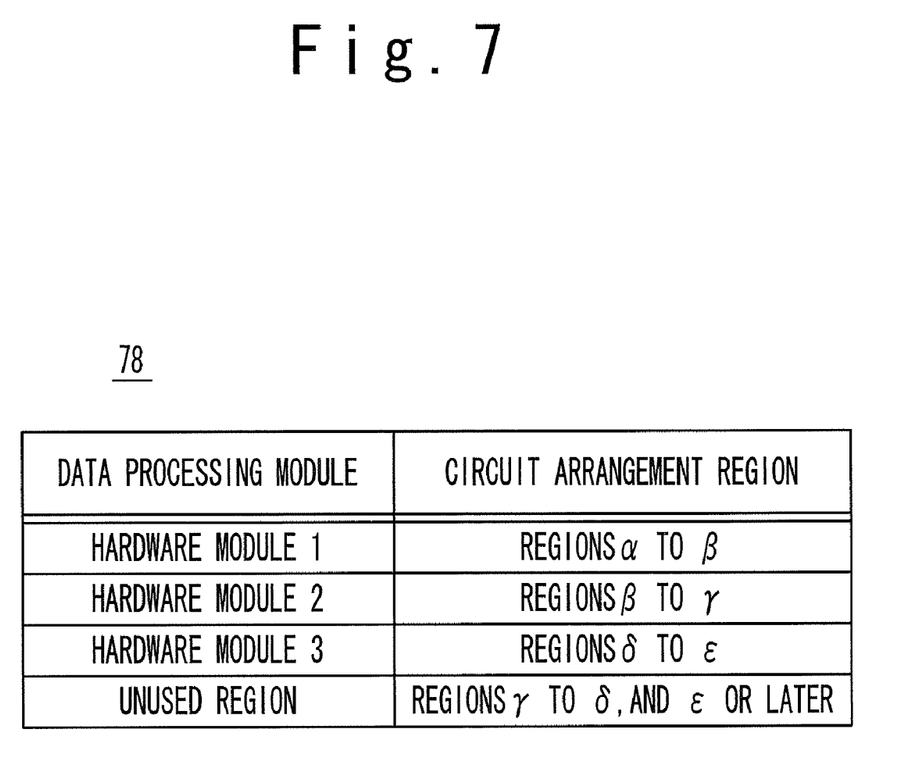
FIG. 7 is a view showing a management information table 78 in a source management part 72.

The resource management section 72 manages the hardware module 61 currently allocated to the reconfigurable logic element 60. Generally, circuit scale used by the hardware module 61 varies depending on the type of the hardware module 61. Thus, when dynamic reconfiguration is performed in the reconfigurable logic element 60, release of the old hardware module 61 from the reconfigurable logic element 60, allocation of the logic element to the new hardware module 61 and management of the unused logic element are carried out. FIG. 7 is a table showing an example of the management information table 78 in the resource management section 72. The data processing modules are associated with circuit arrangement regions. The data processing modules (corresponding to the hardware module 1_61-1 to the hardware module N_61_N) and the circuit arrangement region and unused regions in the reconfigurable logic element 60 are managed.

When dynamic reconfiguration is performed in the reconfigurable logic element 60, the reconfigurable logic element management unit 70 determines a newly configured hardware module 61 and a circuit released from the reconfigurable logic element 60 as the above-mentioned details, for example, on the basis of data in the statistical processing section 71. The reconfigurable logic element management unit 70 is connected to the reconfigurable logic element 60 and communicates with the reconfigurable logic element 60 via a circuit setting signal (configuration signal) 73. The reconfigurable logic element management unit 70 is connected to the hardware module configuration information database 80 and communicates with the hardware module configuration information database 80 via a circuit configuration information setting signal (configuration signal) 74.

The hardware module configuration information database 80 stores configuration information of the hardware modules 61 which can be configured in the reconfigurable logic element 60 therein. That is, the hardware modules (types) are associated with the configuration information of the hardware modules 61. The configuration information of the hardware modules is exemplified information on a logic configuration of logic cells and logic blocks forming the hardware modules and information on connection relationship among the logic cells, logic blocks and memory modules. The stored configuration information of the hardware modules is associated with the software modules in the software 50 as the hardware module. For example, in FIG. 4, the software modules are associated with the hardware modules in the data processing modules. That is, the hardware module 61 is defined as the hardware module for executing processing of the input data 100 of a certain type.

When dynamic reconfiguration is performed in the reconfigurable logic element 60, referring to the hardware module configuration information database 80, the reconfigurable logic element management unit 70 acquires hardware module configuration information (not shown) of the hardware module 61 to be reconfigured and notifies the hardware module configuration information to the reconfigurable logic element 60.

The IF unit 10, the input data processing determination database 20, the CPU 40, the reconfigurable logic element 60, the reconfigurable logic element management unit 70 and the hardware module configuration information database 80 can communicate with one another via the management line bus 90. The management line bus 90 is a bus for setting data and confirming the state.

Figure 2:
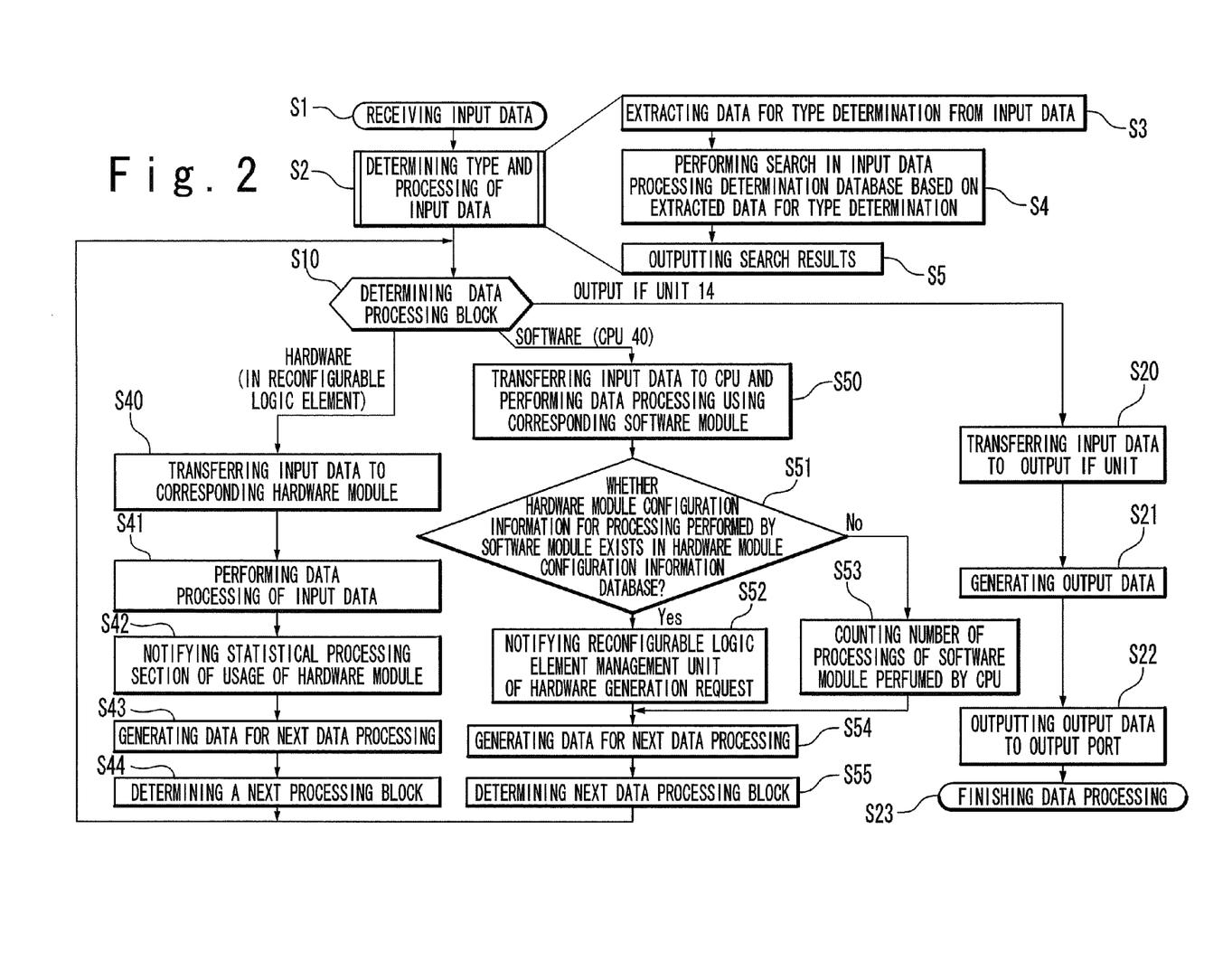
FIG. 2 is a flowchart showing an operation of the embodiment of the data processing device according to the present invention.

An operation of the embodiment of the data processing device according to the present invention will be explained. FIG. 2 is a flowchart showing the operation of the embodiment of the data processing device (the embodiment of the data processing method) according to the present invention.

First, the input data 100 arrives from the input port 11 to the input IF unit 13 (Step S1). The input IF unit 13 determines the type and processing of the input data 100 (Step S2). Specifically, first, the input IF unit 13 extracts data for data type determination from the input data 100 (Step S3). The data for data type determination is whole or part of the input data 100. Next, the input IF unit 13 outputs the database access signal 15 containing the data for data type determination to the input data processing determination database 20. On the basis of the data for data type determination, the input data processing determination database 20 performs search (Step S4). The input data processing determination database 20 replies the processing details (for example, the data processing in FIG. 5A) and the data processing block (for example, the data processing module in FIG. 5A) as search results to the input IF unit 13 (Step S5).

The data IF unit 13 determines a destination of the input data 100 on the basis of the search results of the input data processing determination database 20 (Step S10). When the data processing block (for example, the data processing module in FIG. 5A) is hardware (Step S10: hardware), the input IF unit 13 transfers the input data 100 to the corresponding hardware module 61 (Step S40). The corresponding hardware module 61 performs data processing of the input data 100 (Step S41). The hardware module 61 notifies the statistical processing section 71 that the hardware module 61 is used after start of data processing by using the circuit use notification information 62 (Step S42). On completion of data processing, the hardware module 61 generates data for next data processing on the basis of the data processing result (Step S43). Referring to information on the next data processing module previously set in the hardware module 61, the hardware module 61 determines a next processing block (Step S44). In this case, the hardware module 61 bypasses Step S10 and transfers generated data to the corresponding data processing block. When the data processing block is the hardware module, the procedure proceeds to Step S40, when the data processing block is the software module, the procedure proceeds to Step S50, and when the data processing block is the output IF unit, the procedure proceeds to Step S20.

When the data processing block (for example, the data processing module in FIG. 5A) is software (Step S10: software), the input IF unit 13 transfers the input data 100 to the CPU 40 to perform the data processing in the software module 51. The CPU 40 performs data processing using the corresponding software module 51 (Step S50). Responding to the fact that the software module 51 is used, referring to the correspondence table 52 of the software 50 to the data type and the data processing module (FIG. 4), the CPU 40 determines whether or not the hardware module configuration information for the processing performed by the software module 51 exists in the hardware module configuration information database 80 (Step S51). Specifically, in FIG. 4, it is determined whether or not the hardware module corresponding to the software module of the data processing module exists. When the hardware module exists, the corresponding hardware module configuration information exists in the hardware module configuration information database 80.

When the corresponding hardware module configuration information exists (Step S51: Yes), the CPU 40 notifies the reconfigurable logic element management unit 70 of a hardware generation request of the hardware module via the management line bus 90 (Step S52). At this step, a switching request from the software module to the hardware module in the corresponding data processing module by the dynamic reconfiguration is notified.

When the corresponding hardware module configuration information does not exist (Step S51: No in FIG. 2), the CPU 40 counts the number of processings of the software module and stores the number of processings in the memory 50a (Step S53). Thus, although switching by the dynamic reconfiguration cannot be requested since the hardware module configuration information does not exist in the current configuration, by recording the number of processings of each software module, frequently called processing can be grasped. As a result, by newly adding hardware module configuration information corresponding to the software module performing the frequently called processing to the hardware module configuration information database 80, processing switching by dynamic reconfiguration can be achieved.

After it is determined whether or not the hardware module configuration information of the hardware module exists (Step S51), on completion of the data processing, the software module 51 generate data for next data processing on the basis of the data processing result (Step S54). Referring to information on the next data processing module previously set in the software module 51, the software module 51 determines the next data processing block (Step S55). In this case, the software module 51 bypasses Step S10 and transfers generated data to the corresponding data processing block. When the data processing block is the hardware module, the procedure proceeds to Step S40, when the data processing block is the software module, the procedure proceeds to Step S50, and when the data processing block is the output IF unit, the procedure proceeds to Step S20.

When the data processing block (for example, the data processing module in FIG. 5A) is the output IF unit 14 (Step S10: output IF unit), the input IF unit 13 transfers the input data 100 to the output IF unit 14 (Step S20). The output IF unit 14 generates the output data 200 from the input data 100 (Step S21). Finally, the output IF unit 14 outputs the output data 200 to the output port 12 (Step S22) and the data processing is finished (Step S23).

Figure 3:
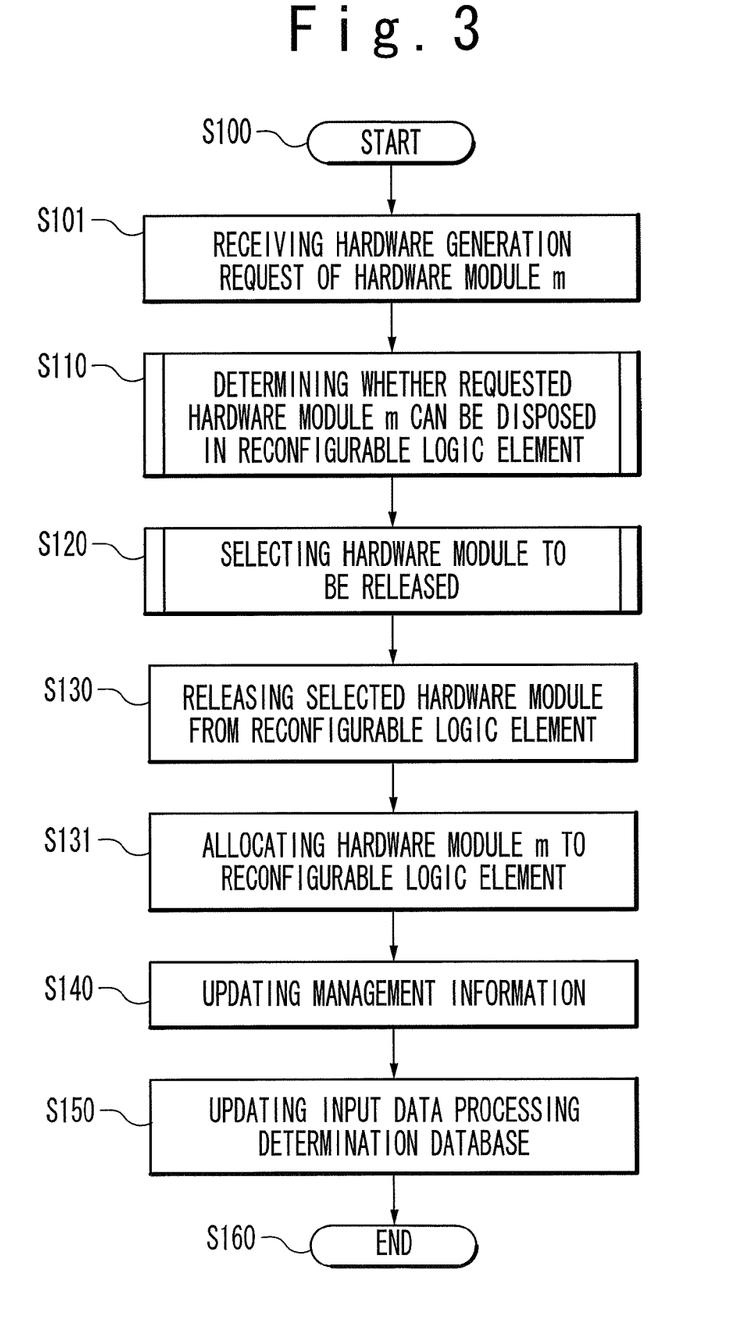
FIG. 3 is a flowchart showing a hardware module reconfiguration determination performed by a reconfigurable logic element management unit 70 in the operation of the embodiment of the data processing device according to the present invention.

FIG. 3 is a flowchart showing hardware module reconfiguration determination performed by the reconfigurable logic element management unit 70 in the operation of the embodiment of the data processing device according to the present invention.

First, the reconfigurable logic element management unit 70 receives the hardware generation request of the hardware module m ($1 \leq m \leq N$) from the CPU 40 at Step S52 (Step S101). The resource management section 72 of the reconfigurable logic element management unit 70 determines whether the number of hardware generation requests is equal to or more than a hardware start threshold value and a requested hardware module m can be disposed in the reconfigurable logic element (Step S110). Determination is made referring to the management information table 78 of the resource management section 72 in FIG. 7 and the hardware module configuration information database 80. Specifically, on the basis of the hardware module configuration information (the hardware module configuration information database 80) of the hardware module m, the resource management section 72 determines whether or not the hardware module m can be configured in the unused region of the circuit arrangement regions.

When the hardware module m cannot be disposed because of the lack of the unused logic elements of the reconfigurable logic element 60 (the unused region of the circuit arrangement region), from the currently set hardware modules, the resource management section 72 selects the hardware module 61 to be released from the reconfigurable logic element 60 by switching the hardware processing to the software processing (Step S120). In the example shown in FIG. 6, there are hardware generation requests to the unallocated hardware module 4. Among the allocated hardware modules, the hardware module 2 has the longest LRU and keeps the unused state longest. This means that the hardware module 2 is a candidate to be released. Furthermore, the hardware module of the small number of usage or short usage time may be selected as the candidate to be released. The statistical processing section 71 grasps these data. The resource management section 72 determines the hardware module 61 to be released and then, releases the selected hardware module 61 from the reconfigurable logic element 60 (Step S130). In the example shown in FIG. 6, the hardware module 2 is released. Next, the resource management section 72 allocates the hardware module m to the reconfigurable logic element 60 (Step S131). In the example shown in FIG. 6, the hardware module 4 is allocated.

After completion of allocation, the reconfigurable logic element management unit 70 updates management information (Step S140). Specifically, the management information includes the management information table 77 (FIG. 6) managed by the statistical processing section 71 and the management information table 78 managed by the resource management section 72 (FIG. 7). After update of the management information, the reconfigurable logic element management unit 70 updates the input data processing determination database 20 by the reconfigurable logic element update notification signal 75 (Step S150) and processing is finished (Step S160). In the example shown in FIG. 6, as a result of update, FIG. 5A is updated to FIG. 5B. That is, in FIG. 5A, the hardware module 2 is selected as the data processing module for the data type of Type 2 and the software module 4 of the software module is selected as the data processing module for the data type of Type 4. However, as a result of dynamic reconfiguration, the data processing module for the data type of Type 2 is updated to the software module 2 and the data processing module for the data type of Type 4 is updated to the hardware module 4.

In the present embodiment, the number of usage or usage time of the hardware modules 61 in the reconfigurable logic element 60 is measured. The number of usage or usage time of each hardware module 61 is notified as the circuit use notification information 62 to the reconfigurable logic element management unit 70. Since the newly disposed hardware module and the released hardware module are dynamically determined in the statistical processing section 71 and the resource management section 72 in the reconfigurable logic element management unit 70 at all times, the efficiency of the reconfigurable logic element 60 can be optimized.

The present invention can be applied to a network device of changing processing details according to traffic state.

According to the present invention, it is possible to dynamically reconfigure a logic circuit according to processing details and throughput of data to be input. Furthermore, it is possible to dynamically switch between the software processing and the hardware processing by using the function of setting/canceling the hardware processing to a dynamic reconfigurable logic element.

According to the present invention, it is possible to dynamically reconfigure a logic circuit according to processing details and throughput of data to be input. The reason is that a means configured to detect processing details and throughput of the input data, a means configured to determine a logic circuit to be changed on the basis of the detection result and a means configured to dynamically reconfigure the logic circuit are provided.

According to the present invention, it is possible to dynamically switch between the software processing and the hardware processing by using the function of setting/canceling the hardware processing to a dynamic reconfigurable logic element. The reason is that a means configured to reflect the information that hardware processing is set/cancelled to the dynamic reconfigurable logic element on a transfer information of the input data to a processing module and transfer the input data to the processing module when the hardware processing exists is provided.

Furthermore, according to the present invention, taking arrival of data as a moment, configuration of the reconfigurable logic element can be changed. The reason is that an operating state of the processing module (software/hardware) is updated taking arrival of data as a moment and as a result, the hardware module can be newly set to the reconfigurable logic element.

It is apparent that the present invention is not limited to the above embodiment that may be modified and changed without departing from the scope and spirit of the invention.

The invention claimed is:

1. A data processing device comprising:
a memory which stores a plurality of software modules;
a processing unit which executes said plurality of software modules;
a reconfigurable logic element configured to implement a plurality of hardware modules, the plurality of hardware modules performing processing equivalent to processing performed by said plurality of software modules;

and a management unit that, in response to a received input data, determines one of a first software module among the plurality of software modules and a first hardware module among the plurality of hardware modules to perform processing on the input data, instructs, when the reconfigurable logic element is configured to implement the first hardware module, the reconfigurable logic element to perform the processing using the first hardware module, and instructs, when the reconfigurable logic element is not configured to implement the first hardware module, the processing unit to perform the processing using the first software module, determines that the first software module is a most frequently used software module among the plurality of software modules, determines a second hardware module among the plurality of hardware modules that is a least frequently used hardware module among the plurality of hardware modules, and configures the reconfigurable logic element to implement the first hardware module and not implement the second hardware module.

2. The data processing device according to claim 1, wherein said management unit determines that said first software module is the most frequently used software module on the basis of a frequency of use of each of said plurality of software modules and determines that the second hardware module is the least frequently used hardware module on the basis of a frequency of use of each of said plurality of hardware modules of which said logic element is configured to implement.

3. The data processing device according to claim 2, wherein said second hardware module is determined on the basis of the number of use and operating time of each of said plurality of hardware modules.

4. The data processing device according to claim 2, wherein said second hardware module is determined on the basis of LRU (Least Recently Used) time as the time which has elapsed since last data processing.

5. The data processing device according to claim 2, wherein said second hardware module determined on the basis of a FIFO rule.

6. The data processing device according to claim 2, further comprising:

a first database which stores configuration information, the configuration information comprising a configuration of each of said plurality of hardware modules;

a second database which stores an index that associates a data type with each of the plurality of software modules and each of the plurality of hardware modules; and a data input unit which receives said input data wherein on the basis of a data type of said input data, with reference to said second database, when said data type of said input data corresponds to one of said plurality of hardware modules, said data input unit transfers said input data to said corresponding one of said plurality of hardware modules, and when said data type of said input data does not correspond to any of said plurality of hardware modules, said data input unit transfers said input data to said processing unit.

7. A data processing device comprising:

a management unit which detects a setting state of a hardware module when a dynamically reconfigurable logic element is one of configured to implement said hardware module and configured to not implement said hardware module;

a database which stores an index that associates a data type with each of a plurality of software modules that perform processing equivalent to a plurality of hardware modules including said hardware module and each of the plurality of hardware modules, said database updated by said management unit on the basis of said detected setting state; and a data input unit which receives input data, wherein, in response to said data input unit receiving said input data, said management unit determines one of a first software module among the plurality of software modules and a first hardware module among the plurality of hardware modules to perform processing on the input data, instructs, when the reconfigurable logic element is configured to implement the first hardware module, the reconfigurable logic element to perform the processing using the first hardware module, and, when the reconfigurable logic element is not configured to implement the first hardware module, determines that the first software module is a most frequently used software module among the plurality of software modules, determines a second hardware module among the plurality of hardware modules that is a least frequently used hardware module among the plurality of hardware modules, and configures the reconfigurable logic element to implement the first hardware module and not implement the second hardware module.

8. The data processing device according to claim 7, wherein on the basis of said data type of said input data, with reference to said database, when said data type of said input data is not associated with one of the plurality of hardware modules to which the reconfigurable logic element is configured to implement, said data input unit transfers said input data to a processing unit.

9. A data processing method comprising:

storing a plurality of software modules in a memory;

configuring a reconfigurable logic element to implement a plurality of hardware modules, the plurality of hardware modules performing processing equivalent to processing performed by the plurality of software modules;

determining, in response to a received data input, one of a first software module among the plurality of software modules and a first hardware module among the plurality of hardware modules to perform processing on the input data;

instructing, when the reconfigurable logic element is configured to implement the first hardware module, the reconfigurable logic element to perform the processing using the first hardware module; and instructing, when the reconfigurable logic element is not configured to implement the first hardware module, a processing unit to perform the processing using the first software module, determining that the first software module is a most frequently used software module among the plurality of software modules, determining a second hardware module among the plurality of hardware modules that is a least frequently used hardware module among the plurality of hardware modules, and configuring the reconfigurable logic element to implement the first hardware module and not implement the second hardware module.

10. The data processing method according to claim 9, wherein said determining that said first software module is the most frequently used software module comprises determining that said first software module is the most frequently used software module on the basis of a frequency of use of each of said plurality of software modules, and wherein said determining that the second hardware module is the least frequently used hardware module comprises determining that the second hardware module is the least frequently used hardware module on the basis of a frequency of use of each of said plurality of hardware modules of which said logic element is configured to implement.

11. The data processing method according to claim 10, wherein said second hardware module is determined on the basis of the number of use and operating time of each of said plurality of hardware modules.

12. The data processing method according to claim 10, wherein said second hardware module is determined on the basis of LRU (Least Recently Used) time as the time which has elapsed since last data processing.

13. The data processing method according to claim 10, wherein said second hardware module is determined on the basis of a FIFO rule.

14. The data processing method according to claim 10, further comprising:
storing, in a first database, configuration information, the configuration information comprising a configuration of each of said plurality of hardware modules;
storing, in a second database, an index that associates a data type with each of the plurality of software modules and each of the plurality of hardware modules;
receiving, by an input unit, the input data;
transferring said input data to said first hardware module when said data type of said input data corresponds to said first hardware module and transferring said input data to said first software module when said data type of said input data does not correspond to said first hardware module.

15. A data processing method comprising:
detecting a setting state of a hardware module when a dynamically reconfigurable logic element is one of configured to implement said hardware module and configured to not implement said hardware module; and
storing, in a database, an index which associates a data type with each of a plurality software modules that perform processing equivalent to a plurality of hardware modules including said hardware module and each of the plurality of a hardware modules,
receiving, by a data input unit, input data;
determining, by a management unit, in response to said data input unit receiving said input data, one of a first software module among the plurality of software modules and a first hardware module among the plurality of hardware modules to perform processing on the input data;
instructing, when the reconfigurable logic element is configured to implement the first hardware module, the reconfigurable logic element to perform the processing using the first hardware module; and
determining, when the reconfigurable logic element is not configured to implement the first hardware module, that the first software module is a most frequently used software module among the plurality of software modules, determining a second hardware module among the plurality of hardware modules that is a least frequently used hardware module among the plurality of hardware modules, and configuring the reconfigurable logic element to implement the first hardware module and not implement the second hardware module.

16. The data processing method according to claim 15, further comprising:
transferring, on the basis of said data type of said input data, with reference to said database, said input data to a processing unit, when said data type of said input data is not associated with one of the plurality of hardware modules to which the reconfigurable logic element is configured to implement, to a processing unit.

* * * * *